(12) United States Patent
Link et al.

(10) Patent No.: US 7,421,395 B1
(45) Date of Patent: Sep. 2, 2008

(54) SYSTEM AND METHOD FOR PRODUCING UNIQUE ACCOUNT NAMES

(75) Inventors: Craig A. Link, Seattle, WA (US);
Nicholas Berry, Redmond, WA (US);
Dean M. Pachosa, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/506,767

(22) Filed: Feb. 18, 2000

(51) Int. Cl.
*G06Q 40/00* (2006.01)
(52) U.S. Cl. ......................................... 705/1
(58) Field of Classification Search ................. 709/229, 709/203, 245, 201, 206, 219, 220, 226; 707/10, 707/103 R, 104.1, 9; 379/88.02; 713/201; 370/522; 380/30
See application file for complete search history.

(56) References Cited

U.S. PATENT DOCUMENTS

| | | | | |
|---|---|---|---|---|
| 3,792,446 A | * | 2/1974 | McFiggins et al. | 705/403 |
| 4,775,956 A | * | 10/1988 | Kaji et al. | 704/7 |
| 5,117,351 A | * | 5/1992 | Miller | 395/650 |
| 5,423,042 A | * | 6/1995 | Jalili et al. | 395/700 |
| 5,563,878 A | * | 10/1996 | Blakeley et al. | 370/392 |
| 5,581,765 A | * | 12/1996 | Munroe et al. | 395/677 |
| 5,588,056 A | * | 12/1996 | Ganesan | 713/183 |
| 5,745,902 A | * | 4/1998 | Miller et al. | 707/200 |
| 5,768,519 A | * | 6/1998 | Swift et al. | 395/200.53 |
| 5,790,785 A | * | 8/1998 | Klug et al. | 713/202 |
| 5,874,988 A | * | 2/1999 | Gu | 348/97 |

(Continued)

FOREIGN PATENT DOCUMENTS

JP        7108119        * 11/1996

OTHER PUBLICATIONS

Petreley, Nicholas et al., "Benchmarktest serves up Secondhand Tomatoes and Argle Toast", InfoWorld, Jul. 5, 1993, vol. 15, Issue 27, p. 55.*

(Continued)

*Primary Examiner*—Hani M. Kazimi
*Assistant Examiner*—Olabode Akintola
(74) *Attorney, Agent, or Firm*—Shook, Hardy & Bacon L.L.P.

(57) ABSTRACT

A system and method are provided for producing one or more unique account names in response to a user request, or in response to a user attempting to adopt another name that is unavailable. When performed in response to a user request, the method includes the steps of combining a randomly selected word element, such as an affix or adjective, and a randomly selected stem, such as a noun, to produce a random account name, and comparing the name with a list of existing account names to determine if it is unique. If so, the unique name is provided to the user for acceptance. Additional unique names can be produced by the same or a different method so that the user is presented with a plurality of unique names for consideration. For example, if the user attempts to adopt a name that is unavailable, a unique modified account name can be produced that is based on the name entered by the user. The modified name is produced by combining the requested name or a stem thereof with a randomly generated word element or a numerical seed to produce an alternate account name, comparing the name with the list of existing account names to determine if it is unique and, if so, providing it to the user for acceptance.

46 Claims, 5 Drawing Sheets

U.S. PATENT DOCUMENTS

| | | | | |
|---|---|---|---|---|
| 5,961,593 | A | * | 10/1999 | Gabber et al. ............... 709/219 |
| 5,966,686 | A | * | 10/1999 | Heidorn et al. ................ 704/9 |
| 5,995,730 | A | * | 11/1999 | Blinne ........................... 716/4 |
| 6,085,242 | A | * | 7/2000 | Chandra ..................... 709/223 |
| 6,121,533 | A | * | 9/2000 | Kay ............................. 84/616 |
| 6,148,420 | A | * | 11/2000 | Schlater et al. .............. 714/39 |
| 6,173,313 | B1 | * | 1/2001 | Klots et al. ................. 709/203 |
| 6,195,660 | B1 | * | 2/2001 | Polnerow et al. .............. 707/10 |
| 6,233,577 | B1 | * | 5/2001 | Ramasubramani et al. ..... 707/9 |
| 6,292,904 | B1 | * | 9/2001 | Broomhall et al. ............. 714/1 |
| 6,298,341 | B1 | * | 10/2001 | Mann et al. .................... 707/3 |
| 6,430,708 | B1 | * | 8/2002 | Evans .......................... 714/38 |
| 6,564,247 | B1 | * | 5/2003 | Todorov ..................... 709/206 |
| 2003/0126033 | A1 | * | 7/2003 | Evans et al. .................. 705/26 |
| 2004/0098485 | A1 | * | 5/2004 | Larson et al. ............... 709/227 |

OTHER PUBLICATIONS

Jim DeRoest, "Hardening AIX security", SunExpert, Brookline:MA, Sep. 1998, vol. 9, Iss. 9, p. 60, 4pgs.*

Scott Nesbitt, "Web e-mail services", Link-up, Medford:MA, May/Jun. 1999, vol. 16, Iss. 3; p. 24, 1 pgs.*

Eric Bach, Efficient Prediction of Marsaglia-Zaman Random Number Generators, IEEE Transactions on Information Theory, vol. 44, No. 3, May 1998.*

Scott Nesbitt, "Web e-mail services", Link-up, Medford:MA May/Jun. 1999, vol. 16, Iss. 3; p. 24, 1pgs.*

Johnson, L., "How To . . . Install and Begin Using American Online", May 1997, vol. 3, Iss. 5.*

Lichty et al, America on line Tour Guide, 4th edition, 1998, pp. 428-429, 442-443.*

Lichty et al., America on line Tour Guide, 4th edition, 1998.*

* cited by examiner

SYSTEM AND METHOD FOR PRODUCING UNIQUE ACCOUNT NAMES

TECHNICAL FIELD

The present invention relates generally to systems and methods for establishing unique account names for the users of a service such as an online service.

BACKGROUND OF THE INVENTION

It is conventional for online service providers to identify each user by an account name that is unique from all other account names. Such identifiers are sometimes referred to as user names or user IDs, and are either assigned by the service provider or requested by the user upon initial use of the service. When the account names are assigned or requested, they are first checked against a list of existing account names to ensure against the use of the same account name by more than one user. Once a name is determined to be unique, it is presented to the user as his or her account name, and is used either for the single transaction being conducted, or as a more permanent account name by which the user can request the services over time.

An example of an existing online service in which account names are employed is the MSN GAMING ZONE online gaming service offered by Microsoft Corporation. The MSN GAMING ZONE service provides games over the Internet so that multiple users can participate simultaneously in multi-player games. In addition, the service provides chat capabilities, player ladders and rankings, game downloads and other services related to the primary service of providing gaming.

When a user enters the MSN GAMING ZONE service, a request is presented for the user's account name. If the user has used the service before and already has a unique account name, he or she enters the name into a text box, such as an edit control, presented by the service and is allowed access to the various services offered. The account name is used to provide information to the user regarding previous transactions, and the account name is used by the service for informational and/or billing purposes.

If a user has not yet been assigned an account name, he or she can request one by entering a desired name into the text box presented by the service. The service then compares the requested name with a list of existing names to determine if the requested name is unique, and informing the user of the result. If the requested account name is unique, it is assigned to the user, and the user is permitted access to the services offered. However, if the requested name is not unique, i.e. it has already been assigned, an error message is displayed informing the user of the unavailability of the account name, and presenting the text box again so that the user can enter another desired account name.

Because some services such as the MSN GAMING ZONE service offered by Microsoft Corporation have millions of users, it can be very difficult for a user to identify an account name that is unique. Many users attempt to request account names that are easy to remember, such as first names or nick names. Often, such names are common and have long been assigned to other users. As a result, users unable to request an available name within one or two attempts may give up. Such occurrences can result in the user deciding either not to use the service or to attempt to use another service, and are undesirable to service providers who want to remove obstacles to the use of their services.

SUMMARY OF THE INVENTION

In accordance with the present invention, a system and method are provided for producing one or more unique account names for a user when the user either requests that such account names be presented or attempts to request an account name that is unavailable. The system broadly includes several different name generating components that produce account names, and a search component that compares the generated account names with existing account names to determine whether the generated names are unique. If so, they are presented to the user for consideration, and the user can either accept one of the names or request yet a different name.

The system includes a user interface component for receiving account name requests from users and for presenting unique account names produced by the system to users for acceptance, and a database including a list of existing account names against which the names produced by the system are compared. The database further includes at least one word element list including a plurality of word elements that can be selected by the system to generate one or more of the account names presented to the user. For example, a list of adjectives can be provided so that one of the name generating components can select an adjective and combine it with a name requested by the user to produce a modified account name that can then be checked for uniqueness. A list of nouns can also be provided such that another of the name generating components selects an adjective from the adjective list and a noun from the noun list, and combines them to form a random account name that is checked for availability and presented to the user.

Additional name generating components provide seeded account names by adding numerical seeds to an account name requested by a user after it is determined that the requested name is unavailable. One of the components adds a numerical seed to the end of the requested account name, and if it is determined that the seeded name is unavailable, the seed is increased by a value of one and the name again checked for availability until at least one unique seeded name is identified or until a predetermined number of attempts have been made by the component to produce such a name. Another of the components adds a randomly selected multi-digit numerical seed to the end of the requested account name. If it is determined that the seeded name is unavailable, another seed is randomly selected, combined with the requested name and checked for uniqueness until at least one unique seeded name is identified or until a predetermined number of attempts have been made by the component to produce such a name.

By providing a number of different name generating components, the system is capable of presenting several different unique account names to the user for consideration, and the user is able to either accept one of the proposed names or enter yet a different name. As such, even if the user does not like any of the available names presented by the system, such names may provide inspiration to the user, enabling him or her to select an alternate name that can be checked for availability. In addition, by presenting only names that have been checked for uniqueness by the system, the barrier to entry to the service presented by an "enter account name" request is eliminated.

BRIEF DESCRIPTION OF THE SEVERAL VIEWS OF THE DRAWING

The present invention is described in detail below with reference to the attached drawing, wherein.

DETAILED DESCRIPTION OF THE INVENTION

Figure 3:
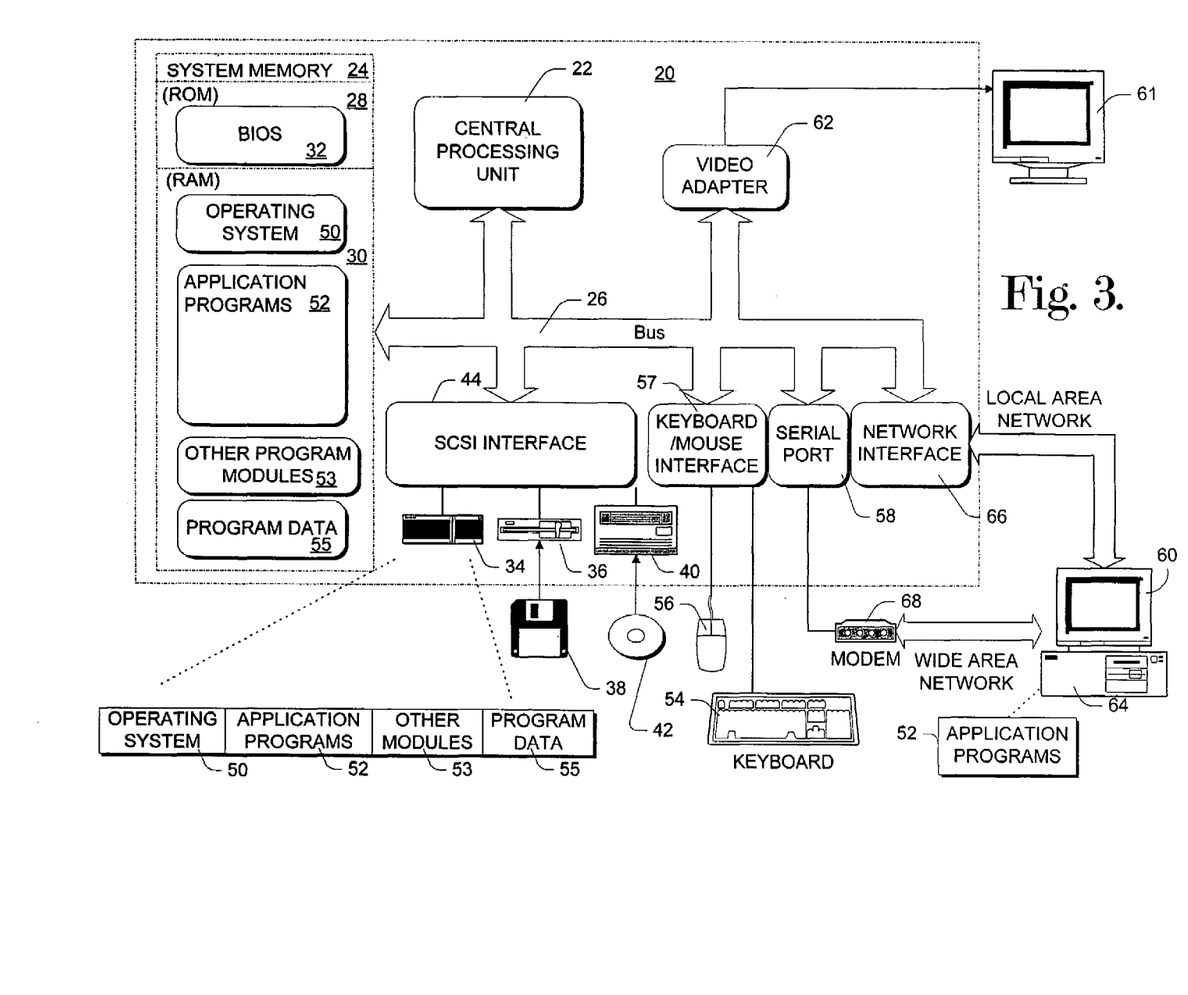
FIG. 3 is a schematic view of an exemplary operating environment in which the invention can be practiced.

FIG. 3 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 3, an exemplary system for implementing the invention includes a general purpose computing device in the form of a conventional personal computer 20, including a processing unit 22, a system memory 24, and a system bus 26 that couples various system components including the system memory to the processing unit 22. The system bus 26 may be any of several types of bus structures including a memory bus or memory controller, a peripheral bus, and a local bus using any of a variety of bus architectures. The system memory includes read only memory (ROM) 28 and random access memory (RAM) 30. A basic input/output system (BIOS) 32, containing the basic routines that helps to transfer information between elements within the personal computer 20, such as during start-up, is stored in ROM 28.

The personal computer 20 further includes a hard disk drive 34 for reading from and writing to a hard disk, not shown, a magnetic disk drive 36 for reading from or writing to a removable magnetic disk 38, and an optical disk drive 40 for reading from or writing to a removable optical disk 42 such as a CD ROM or other optical media. The hard disk drive 34, magnetic disk drive 36, and optical disk drive 40 are connected to the system bus 26 by a Small Computer System Interface (SCSI) 44 or other suitable disk drive controller. The drives and their associated computer-readable media provide nonvolatile storage of computer readable instruction, data structures, program modules and other data for the personal computer 20. Although the exemplary environment described herein employs a hard disk, a removable magnetic disk 38 and a removable optical disk 42, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 38, optical disk 42, ROM 28 or RAM 30, including an operating system 50, one or more application programs 52, other program modules 53, and program data 55. A user may enter commands and information into the personal computer 20 through input devices such as a keyboard 54 and pointing device 56 connected to the processing unit 22 through a keyboard/mouse interface 57 that is coupled to the system bus 26. Other input devices (not shown) may include a microphone, joystick, game pad, satellite dish, scanner, or the like. These and other input devices are often connected to the processing unit 22 through a serial port interface 58 that is coupled to the system bus 26, but may be connected by other interfaces, such as a parallel port, game port or a universal serial bus (USB). A monitor 61 or other type of display device is also connected to the system bus 26 via an interface, such as a video adapter 62. In addition to the monitor, personal computers typically include other peripheral output devices (not shown), such as speakers and printers.

The personal computer 20 may operate in a networked environment using logical connections to one or more remote computers, such as a remote computer 64. The remote computer may be another personal computer, a server, a router, a network PC, a peer device or other common network node, and typically includes many or all of the elements described above relative to the personal computer 20. The logical connections depicted in FIG. 3 include a local area network (LAN) and a wide area network (WAN). Such networking environments are commonplace in offices, enterprise-wide computer networks, intranets and the Internet.

When used in a LAN networking environment, the personal computer 20 is connected to the local network through a network interface or adapter 66. When used in a WAN networking environment, the personal computer 20 typically includes a modem 68 or other means for establishing communications over the wide area network, such as the Internet. The modem 68, which may be internal or external, is connected to the system bus 26 via the serial port interface 58. A separate network interface may also be provided which is capable of accommodating hundreds, thousands or more users at a time. In a networked environment, application programs 52 and other program modules depicted relative to the personal computer 20, or portions thereof, may be stored in the memory storage device of remote computer 64. It will be appreciated that the network connections shown are exemplary and other means of establishing a communication link between the computers may be used.

The present invention includes a number of components that are stored in the memory of the exemplary system. Although the invention is described with reference to an implementation in which it is combined with the Internet or other network services, it has application in any situation where a service provider desires each user of its services to enter a unique account name before accessing some or all of its services. The system of the invention broadly includes a computer-readable medium having computer-executable components for producing a plurality of unique account names in response to a request by a user. Among the components are a user interface component, a database component, one or more name generating components, and a search component.

The user interface component initially presents a display to users, requesting each user to enter an account name before accessing other services being offered. The display includes a conventional text box in which the user can enter a desired account name, and another entry including a command for requesting that a unique name be produced by the system. If the user enters a desired name, it is checked against a list of existing names included in the database component, and is assigned to the user if it is available. If it is not available, the system produces one or more alternate names that are available, and presents them to the user for consideration. If the user wants to accept one of the suggested account names, the name can either be selected by moving the pointing device over the name and selecting it by pressing a button on the pointing device, or the name can be entered in the text box. If the user does not want to accept one of the suggested account names, he or she can enter an alternate account name in the box or select the entry requesting that the system generate alternate names.

If, instead of entering a desired account name, the user selects the entry for requesting that a unique name be produced by the system, the system produces one or more alternate names that are available, and presents them to the user for consideration. The interface component displays the alternate names and the user can either accept one of the names, enter another name, or request that additional names be generated.

Figure 2:
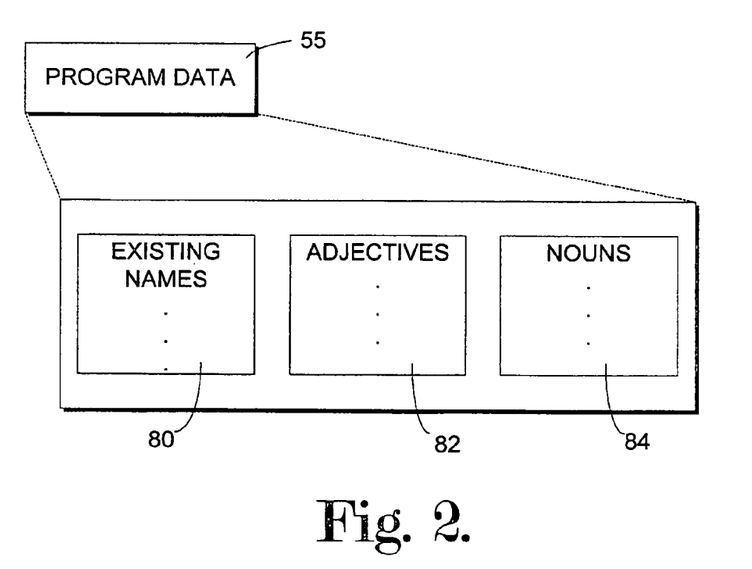
FIG. 2 is a schematic view of a database component forming a part of the present invention.

The database component of the system is shown in FIG. 2, and includes a list of existing account names 80 against which each requested account name is compared in order to determine whether the requested name is unique. In addition, each account name produced by the system is also compared against the names in the list to ensure that the proposed account names are available before they are presented to the user for acceptance. The database component also includes a pair of word element lists 82, 84 that are employed by the name generating components of the system. Preferably, one of the lists 82 includes adjectives or affixes, and the other 84 includes nouns or noun stems. By providing this construction, it is possible to produce account names that have some meaning to the user, enabling the user to remember or identify with the account names. However, any other type of word element lists that provide this type of relationship between the elements thereof could be employed or substituted therefor.

In an exemplary embodiment of the invention, and as illustrated in FIG. 1, four name generating components 86, 88, 90, 92 are employed to produce account names for consideration by the user. The first name generating component 86 (FIG. 1a) includes computer-executable instructions for generating a seeded account name that is based on an account name requested by a user. The component first selects a single digit numerical seed having a value of "0" at 102, and combines the seed with the stem of the requested name, e.g. by stripping the end of the requested name of any numeric characters, underscores, or other symbols used to separate components, and adding the seed to the end of the name stem. This seeded name is then checked at 104 against the existing account names in the database component and, if available, added to a solution set at 106.

Figure 1A:
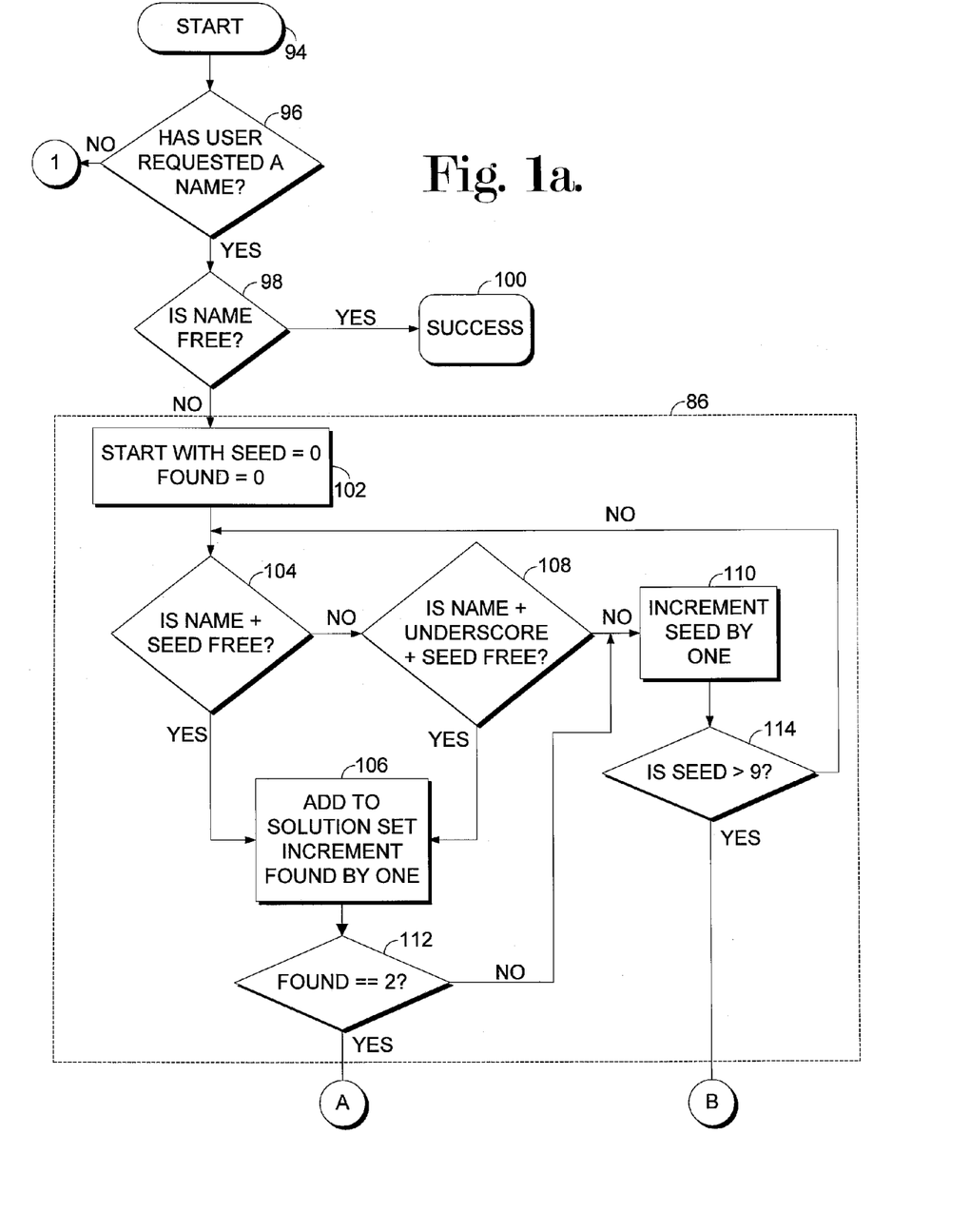
FIG. 1 is a flow chart illustrating the steps of providing a number of unique account names in accordance with the present invention.

If the seeded account name is determined at 104 to already exist in the account name list, the component modifies the seeded account name at 108 by adding and underscore "_" or other symbol between the stem of the requested name and the seed, and the modified name is again checked against the account name list to determine whether it is unique. If so, it is added to the solution set at 106. If not, the seed is incremented by a value of "1" at step 110, combined with the stem of the originally requested account name, and compared with the existing account names in the list at 104 for uniqueness. If unique, the account name is added to the solution set at 106.

The solution set of the system is designed to include a predetermined number of seeded account names of the type produced by the first and/or second components. If the predetermined number has not been reached at 112 by the addition of an available seeded account name, the seed is incremented by a value of "1" at step 110, combined with the stem of the originally requested account name, and checked at 104 against the existing account name list for uniqueness. If unique, it is added to the solution set at 106. If not, an underscore is added between the stem and the seed at 108 and it is checked again for uniqueness. This loop continues until either the predetermined number of seeded account names are provided in the solution set at 112 or until a maximum number of iterations of the loop are performed, as determined at step 114. In accordance with an exemplary embodiment, the seed is initially set at "0" at step 102, and is incremented at 110 during each iteration of the component steps. Once the seed exceeds "9," as detected at 114, the system exits the first component 86.

Figure 1B:
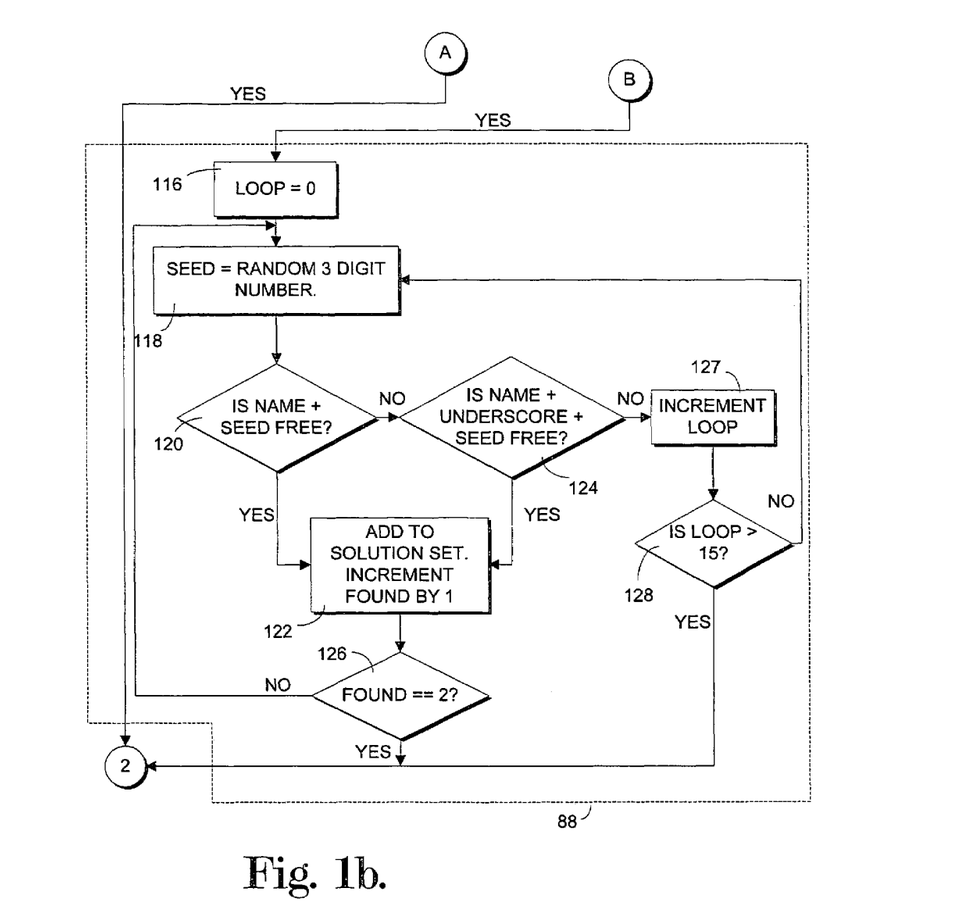

Once the desired number of available account names are provided in the solution set, the system skips the second name generating component 88 and goes directly to the third component 90. However, if the solution set is not filled with the desired number of unique seeded account names after the maximum number of iterations at step 114, the system proceeds to the second name generating component 88.

Like the first component, the second component 88 (FIG. 1b) includes computer-executable instructions for generating a seeded account name that is based on an account name requested by a user. However, unlike the first component, the second component randomly selects a multiple-digit number at 118, e.g. a three digit number, and combines the seed with the stem of the requested name, e.g. by stripping the end of the requested name of any numeric characters, underscores, or other symbols used to separate components, and adding the seed to the end of the name stem. This seeded name is then checked against the existing account names in the database component at 120 and, if available, added to a solution set at 122.

If the seeded account name is determined to already exist in the account name list, the component modifies the seeded account name at 124 by adding an underscore "_" or other symbol between the stem of the requested name and the seed, and the modified name is again checked against the account name list to determine whether it is unique. If so, it is added to the solution set at 122. If not, the seed is replaced by another randomly generated multiple digit seed at 118, combined with the stem of the originally requested account name, and compared with the existing account names in the list at 120 for uniqueness. If unique, the account name is added to the solution set at 122.

If the predetermined number of unique account names to be included in the solution set from the first and second name generating components has not been reached at step 126 by the addition of the first available seeded account name produced by the second component, another seeded name is generated by randomly selecting another multiple digit seed at 118, combining it with the stem of the originally requested account name, and checking the name against the existing account name list at 120 for uniqueness. If unique, it is added to the solution set at 122. If not, an underscore is added between the stem and the seed at 124 and it is checked again for uniqueness. This loop continues until either the predetermined number of seeded account names are provided in the solution set at 126 or until a maximum number of iterations of the loop are performed, as detected at 128. The loop is initially set up at "0" at step 116, and is incremented at 127 so that the determination at step 128 can be made. Once the desired number of available account names are provided in the solution set or the maximum number of iterations are run, the system goes to the third component.

The third name generating component 90 (FIG. 1c) includes computer-executable instructions for generating a modified account name that is based on an account name requested by a user. Initially, at step 132, the component randomly selects a word element such as an adjective from a list of such elements, and combines the selected word element with the requested name, e.g. by adding the word element to the beginning of the name. This modified name is then checked against the existing account names in the database component at 134 and, if available, added to a solution set at 136.

Figure 1C:
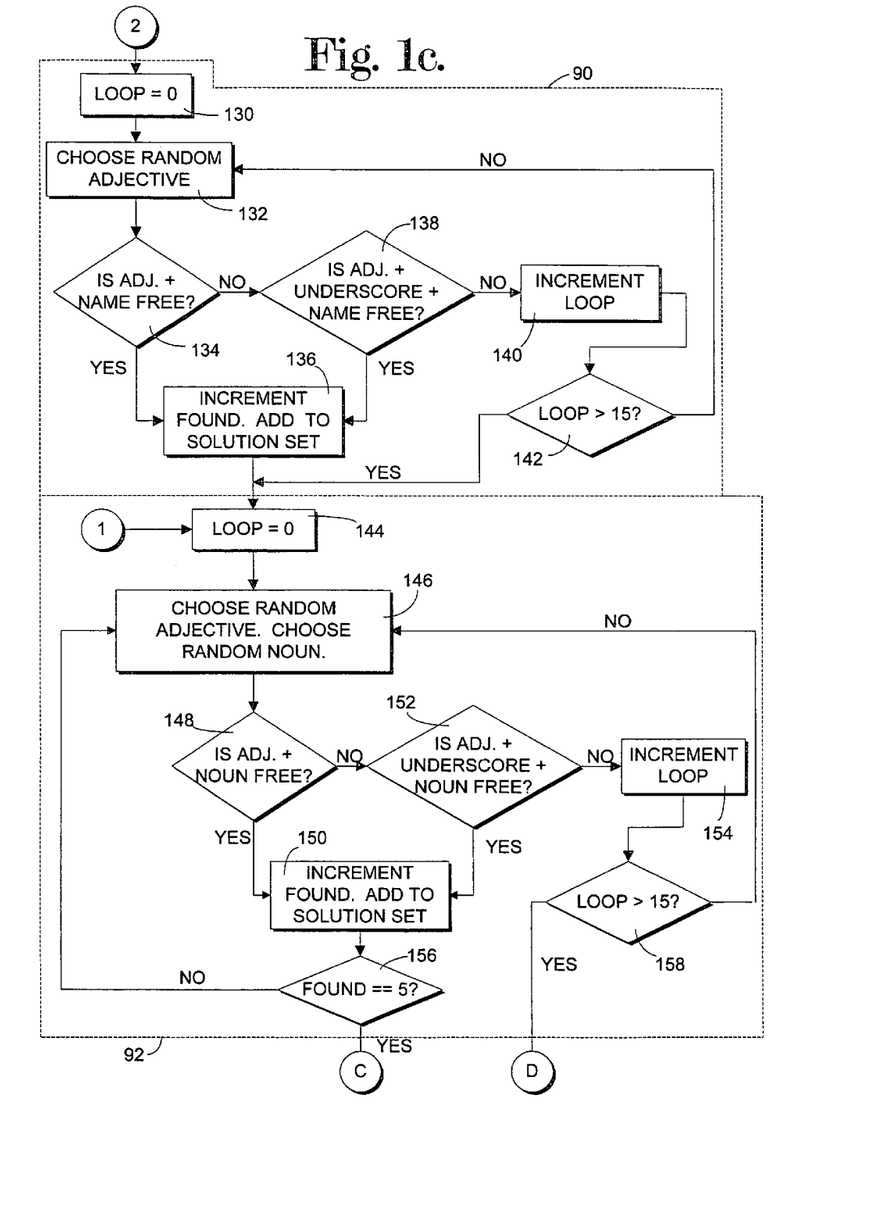

If the modified account name is determined at 134 to already exist in the account name list, the component changes the modified account name at 138 by adding an underscore "_" or other symbol between the word element and the requested name, and the modified name is again checked against the account name list to determine whether it is unique. If so, it is added to the solution set at 136. If not, the word element is replaced by another randomly selected word element at 132, combined with the originally requested account name, and compared with the existing account names in the list at 134 for uniqueness. If unique, the account name is added to the solution set at 136.

The solution set is designed to include a predetermined maximum number of modified account names from the third name generating component 90, and if that number has not yet been achieved, another modified account name is generated by randomly selecting another word element from the word element list at 132, combining it with the originally requested account name, and checking the name against the existing account name list at 134 for uniqueness. If unique, it is added to the solution set at 136. If not, an underscore is added between the word element and the requested name at 138 and it is checked again for uniqueness. This loop continues until either the predetermined number of modified account names are provided in the solution set or until a maximum number of iterations of the loop are performed, as detected at 142. The loop is initially set to "0" at step 130, and is incremented at 140 so that the determination at step 142 can be made. Once the desired number of available account names are provided in the solution set, the system goes to the fourth component 92.

The fourth name generating component 92 (FIG. 1c) includes computer-executable instructions for generating a random account name that is independent of any account name requested by a user. Initially, the component sets a loop to "0" at 144, and randomly selects two word elements at 146 from one or more lists of word elements of the database and combines the two word elements to form the random account name. In an exemplary embodiment of the invention, separate word element lists are provided in the database component, and one word element is selected from each list for use in an account name. One of the lists preferably includes word elements of a particular type, such as adjectives or affixes, while the other list includes nouns or noun stems. As a result of this arrangement, the resulting account names will include a noun or noun stem modified by an adjective or affix. The random name is then checked at 148 against the existing account names in the database component and, if available, added to a solution set at 150.

If the random account name is determined to already exist in the account name list, the component changes the random account name by adding an underscore "_" or other symbol between the word elements at 152 and the random name is again checked against the account name list to determine whether it is unique. If so, it is added to the solution set at 150. If not, two new word elements are randomly selected at 146 and combined to form another account name that is compared with the existing account names in the list for uniqueness at 148. If unique, the account name is added to the solution set at 150.

The solution set is designed to include a predetermined maximum number of random account names from the fourth name generating component, and if that number is greater than one, another random account name is generated at 146 by selecting two new word elements from the word element lists, combining them, and checking the name against the existing account name list at 148 for uniqueness. If unique, it is added to the solution set at 150. If not, an underscore is added between the word elements at 152 and it is checked again for uniqueness. This loop continues until either the predetermined number of modified account names are provided in the solution set, as detected at 156, or until a maximum number of iterations of the loop are performed. The loop is incremented at 154 during each iteration of the component steps, and the value of the loop is checked at 158 to determine whether the number of iterations exceeds a maximum value, e.g. 15. Once the desired number of available account names are provided in the solution set or the maximum number of iterations are run, the system exits the fourth component.

If no unique account names are generated at the conclusion of the foregoing steps, as detected at 160 (FIG. 1d), an error message is generated at 162 and displayed to the user. Otherwise, the account names in the solution set are displayed for consideration by the user at 164. In an exemplary embodiment of the invention, the generated account names are not reserved when added to the solution set. In other words, if a name is generated after already being included in another outstanding solution set, it is possible that two different users might attempt to select the same account name. In order to avoid the possibility of this occurrence, it is possible to temporarily add the names in the solution set to the list of existing account names, or to otherwise reserve the names in the solution set, until the user has selected a desired account name. However, such reserving of generated names does complicate the system, and depending on the size of the database, may be unnecessary.

The search component of the inventive system includes computer-executable instructions for comparing any account name entered by the user or provided by the name generating components with the list of existing account names included in the database component. In an exemplary embodiment, the database and search components are implemented as a stored procedure in a structured query language (SQL) database, and the search component includes instructions for randomly selecting word elements from the word element lists and for searching the existing account name list each time an account name is entered or generated in order to determine whether that account name already exists in the list. If so, the account name is considered unavailable, and is not included in the solution set. Although the existing account name list is intended to include all of the account names that have been assigned by a particular service provider, it may also include additional names determined by the service provider to be unsuitable for use, e.g. profanities or vulgarities. Alternately, it is possible to provide an additional list or table of words or stems that are to be disallowed, and to check each requested account name against the list to make sure that the requested name does not include a disallowed word or stem. If the requested name does include a disallowed word or stem, it is not accepted, and a different name must be adopted. If it does not include a disallowed word or stem and is otherwise available, it is accepted. Thus, even though the list is referred to as an existing account name list, it is not limited to inclusion of only existing account names.

An advantage of the inventive system and method resides in the simplicity of execution of each name generating component, wherein a minimum number of database accesses are required to generate the names. This simple arrangement is beneficial especially in applications where heavy use occurs.

In order to illustrate the method of the present invention, a first example is described, wherein a user enters "Ellie" at 94 (FIG. 1*a*) as a desired account name. In accordance with the present invention, "Ellie" is compared with the names in the existing account name list at 98, and is assigned to the user at 100 if available. However, if "Ellie" is not available, the method provides a list of available alternatives for the user's consideration. In an exemplary embodiment of the invention, this list includes up to five alternate names, as many as two of which are provided by the first and/or second name generating components 86, 88. Another of the names in the list can come from the third name generating component 90, and the remaining names in the list are provided by the fourth name generating component 92.

Assuming that "Ellie" is unavailable, the next step performed in the practice of an exemplary embodiment is to generate up to two seeded account names based on the originally requested name. Thus, a single digit numerical seed having a value of "0" is combined with "Ellie" at 102, e.g. by adding the seed to the end of the name to form "Ellie0." This seeded name is then checked at 104 against the existing account names in the database component and, if available, added to the solution set at 106.

If "Ellie0" is determined to already exist in the account name list, the component modifies the seeded account name at 108 by adding an underscore between the requested name and the seed, and the modified name "Ellie_0" is checked against the account name list to determine whether it is unique. If so, it is added to the solution set at 106. At 110, the seed is incremented by a value of "1", combined with the stem of the originally requested account name to form "Ellie1," and checked against the existing account name list for uniqueness at 104. If unique, it is added to the solution set at 106. If not, an underscore is added between the stem of the requested name and the seed at 108 to form "Ellie_1" and it is checked again for uniqueness. This loop continues until either two seeded account names are provided in the solution set at 112, or until ten iterations of the loop are performed, from "0" up to and including a seed value of "9", as detected at 114.

Once two available account names are provided in the solution set, the system skips the second name generating component 88 and goes directly to the third component 90. However, if the solution set is not filled with two unique seeded account names after the maximum number of ten iterations, the system proceeds to the second name generating component 88.

Assuming that only one unique seeded account name was produced by the first name generating component 86, and that the solution set can include up to two, the method of the invention next randomly selects a multiple-digit seed at 118, e.g. a three digit number, and combines it with the stem of the requested name, e.g. by adding the seed to the end of the name stem to form "Ellie383." This seeded name is then checked at 120 against the existing account names in the database component and, if available, added to a solution set at 122.

If the seeded account name is determined to already exist in the account name list, the component modifies the seeded account name at 124 by adding an underscore between the stem of the requested name and the seed, and the modified name "Ellie_383" is checked against the account name list to determine whether it is unique. If so, it is added to the solution set at 122.

If two unique account names have not been generated by the addition of the first available seeded account name produced by the second component, another seeded name is generated at 118 by randomly selecting another multiple digit seed, combining the seed with the stem of the originally requested account name, e.g. "Ellie847" and this name is checked against the existing account name list at 120 for uniqueness. If unique, it is added to the solution set at 122. If not, an underscore is added between the stem and the seed at 124 and it is checked again for uniqueness. This loop continues until either two seeded account names are provided in the solution set or until fifteen iterations of the loop are performed as detected at 128.

The method next generates a modified account name by randomly selecting a word element such as an adjective from a list of such elements, e.g. "Precious" and combining the selected word element with the requested name, e.g. by adding the word element to the beginning of the name to form "PreciousEllie." The modified name is then checked at 120 against the existing account names in the database component and, if available, added to a solution set at 122.

If the modified account name is determined to already exist in the account name list, the component changes the modified account name by adding an underscore between the word element and the requested name at 124 to form "Precious_Ellie," and the modified name is checked against the account name list to determine whether it is unique. If so, it is added to the solution set. It is noted that the system may include a limitation on the number of characters appearing in the account name, e.g. 15. If so, an additional check must be performed for each name generated by the system in order to determine whether the name satisfies the size restriction. If it does not, the name is treated just as if it is unavailable.

The solution set is designed to include a predetermined maximum number of modified account names from the third name generating component, e.g. 1, and once that number is reached, the method proceeds to the steps provided in the fourth name generating component 92. Alternately, if a unique name is not identified from the foregoing steps, the steps are repeated in a loop until either a modified account name is provided in the solution set or until a maximum number of iterations of the loop are performed.

Next, the method includes the steps of the fourth name generating component 92, wherein a number of random account names are produced for inclusion in the solution set to be presented to the user. In the step 146, a pair of word elements are randomly selected from one or more lists of word elements and combined to form a random account name. As mentioned, one of the lists preferably includes word elements of a particular type, such as adjectives or affixes, while the other list includes nouns or noun stems. The resulting account name includes a noun or noun stem modified by an adjective or affix such that the elements in the name are related. For example, the adjective "Anxious" and the noun "Coffee" might be generated to form the account name "AnxiousCoffee." The random name is then checked against the existing account names in the database component at 148 and, if available, added to the solution set at 150.

If "AnxiousCoffee" is determined to already exist in the account name list, the component changes the random account name by adding an underscore between the elements at 152, e.g. "Anxious_Coffee" and the name is checked against the account name list to determine whether it is unique. If so, it is added to the solution set at 150.

The solution set is designed to include a predetermined maximum number of random account names from the fourth name generating component, e.g. up to five total in the set of five, and so long as the solution set includes fewer unique names than allowed, another random account name is generated by randomly selecting two new word elements and combining them to form another account name, e.g. "Watchful-Moon," that is compared with the existing account names in the list for uniqueness. If unique, the account name is added to the solution set at 150. If not, an underscore is added to the account name at 152 and it is checked again for uniqueness. This loop continues until either five total unique account names are provided in the solution set or until a maximum number of iterations of the loop are performed, e.g. 15 iterations. It is noted that in the examples presented herein, the initial letter of each word element is forced to upper case by the system. However, such capitalization is not required. Further, although a particular implementation of the invention can be case sensitive in comparing requested or generated names with existing ones, such is not required.

Figure 1D:
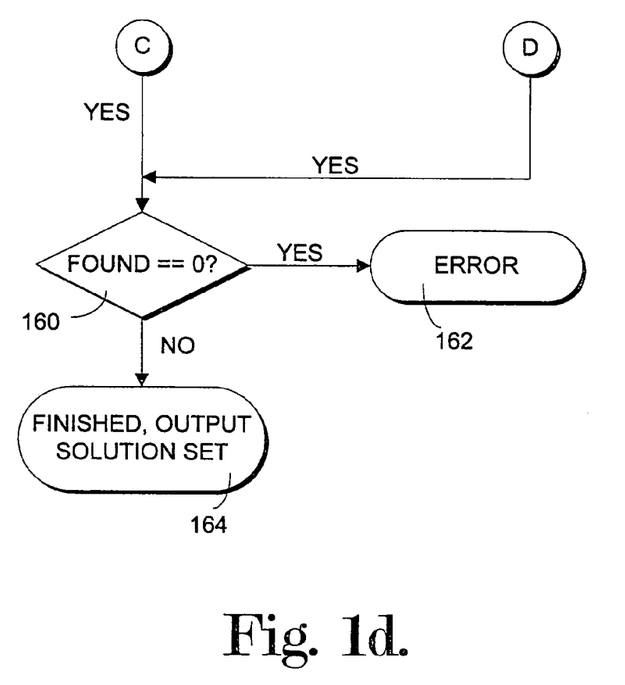

Once the forgoing method steps are complete and a solution set of up to the maximum size is obtained, the list of unique account names included in the solution set is presented to the user at 164 for consideration. If the user would like to use one of the names, he or she can select the name or enter it into the text box provided by the user interface. Alternately, the names provided by the system may inspire the user to select yet a different name which can be entered in the text box, checked for availability, and assigned, if unique.

If instead of originally requesting "Fred" at 94, the user selected the user interface entry requesting that the system provide available names, the steps included in the first, second and third name generating components 86, 88, 90 of the system are not employed, and only the fourth component 92 is used to generate a list of unique random account names. As such, the method includes the initial step 96 of determining whether the user has requested a particular name. If not, the method skips to the step of generating a solution set of up to a predetermined maximum number of unique random names that are provided to the user for consideration. In order to accept one of the names, the user either selects it or enters the name into the text box provided by the system. Alternately, the user can request that the system generate more unique random names for consideration. This process can be repeated until the user is presented with an account name that they wish to accept.

Although the invention has been described with reference to an exemplary embodiment illustrated in the drawing, it is noted that substitutions may be made and equivalents employed herein without departing from the scope of the invention as recited in the claims. This is not required, and can be altered. Likewise, the manner in which the various name generating components are employed, and the size and configuration of the solution set obtained can be altered to suit a particular application.

The invention claimed is:

1. A method of producing a unique modified account name based on a requested account name that has been determined to already exist, the method comprising computer-implemented steps of:
   receiving a requested account name from a user;
   selecting a preexisting word element from at least one preexisting list of word elements;
   combining the preexisting word element and at least a stem of the requested account name to produce a modified account name;
   comparing the modified account name with a list of existing account names to determine whether the modified account name is unique; and
   if the modified account name is unique, providing the modified account name to the user for acceptance.

2. A method as recited in claim 1, wherein the preexisting word element is randomly selected from the at least one preexisting list of word elements.

3. A method as recited in claim 1, wherein the preexisting word element is an adjective.

4. A method as recited in claim 1, wherein the preexisting word element is an affix.

5. A method as recited in claim 1, further comprising producing a second modified account name based on the requested account name that has been determined to already exist, the second modified account name being produced by:
   randomly selecting a second word element from the at least one preexisting list of word elements;
   combining the second selected word element with the at least the stem of the requested account name to produce the second modified account name;
   comparing the second modified account name with the list of existing account names to determine whether the second modified account name is unique; and
   if the second modified account name is unique, providing the second modified account name to the user for acceptance.

6. A method as recited in claim 1, further comprising producing a unique seeded account name based on the requested account name, the unique seeded account name being produced by:
   combining the at least the stem of the requested account name with a numerical seed to produce a first seeded account name;
   comparing the first seeded account name with the list of existing account names to determine whether the first seeded account name is unique; and
   if the first seeded account name is unique, providing the first seeded account name to the user for acceptance.

7. A method as recited in claim 6, wherein the seed is a single digit number, the method further comprises incrementing the numerical seed by one if the first seeded account name is not unique, combining the at least the stem of the requested account name with the incremented seed to produce a second seeded account name, comparing the second seeded account name with the list of existing account names to determine whether the second seeded account name is unique, and if the second seeded account name is unique, providing the second seeded account name to the user for acceptance.

8. A method as recited in claim 6, wherein the numerical seed is a multi-digit number that is randomly generated.

9. A method as recited in claim 8, further comprising generating a second multi-digit numerical seed if the first seeded account name is not unique, combining the at least the stem of the requested account name with the second numerical seed to produce a second seeded account name, comparing the second seeded account name with the list of existing account names to determine whether the second seeded account name is unique, and if the second seeded account name is unique, providing the second seeded account name to the user for acceptance.

10. A method as recited in claim 6, further comprising combining the at least the stem of the requested account name with both an underscore and the numerical seed to produce a second seeded account name if the first seeded account name is not unique, comparing the second seeded account name with the list of existing account names to determine whether the second seeded account name is unique, and if the second seeded account name is unique, providing the second seeded account name to the user for acceptance.

11. A method as recited in claim 1, further comprising:
   randomly selecting two further word elements and combining them to produce a random account name;
   comparing the random account name with a list of existing account names to determine if the random account name is unique; and
   if the random account name is unique, providing the account name to a user for acceptance.

12. A method as recited in claim 1, wherein if the modified account name is not unique, the operations producing the unique modified account name are repeated for up to a predetermined number of iterations until a unique modified account name is produced.

13. A method as recited in claim 5, wherein if the second modified account name is not unique, the operations producing the unique second modified account name are repeated for up to a predetermined number of iterations until a unique second modified account name is produced.

14. A method as recited in claim 6, wherein if the first seeded account name is not unique, the operations producing the unique first seeded account name are repeated for up to a predetermined number of iterations until a unique first seeded account name is produced.

15. A method as recited in claim 1, further comprising combining the requested account name with both an underscore and the randomly selected word element to produce a second modified account name if the first modified account name is not unique, comparing the second modified account name with the list of existing account names to determine whether the second modified account name is unique, and if the second modified account name is unique, providing the second modified account name to the user for acceptance.

16. The method of claim 1, further comprising:
   receiving an acceptance of the modified account name from the user.

17. The method of claim 1, further comprising:
   receiving an alternate requested account name from the user.

18. The method of claim 1, further comprising:
   receiving a request to generate an alternate account name from the user.

19. The method of claim 1, wherein the preexisting word element is a noun.

20. The method of claim 1, wherein the preexisting word element is a noun stem.

21. The method of claim 1, wherein the method is repeated until a predetermined number of modified account names is produced.

22. A computer-readable medium having computer-executable instructions which when executed by a computing device performs a method of producing a unique modified account name based on a requested account name that has been determined to already exist, the method comprising:
   selecting a preexisting word element from at least one preexisting list of word elements;
   combining the preexisting word element and at least a stem of the requested account name to produce a modified account name;
   comparing the modified account name with a list of existing account names to determine whether the modified account name is unique; and
   if the modified account name is unique, providing the modified account name to the user for acceptance.

23. A method of producing a unique random account name in response to a request by a user, the method comprising computer-implemented steps of:
   receiving a requested account name from a user;
   selecting a first preexisting word element from a database including at least one preexisting list of word elements;
   selecting a second preexisting word element from the database;
   combining the first and second preexisting word elements to produce a random account name;
   comparing the random account name with a list of existing account names to determine if the random account name is unique; and
   if the random account name is unique, providing the random account name to the user for acceptance.

24. A method as recited in claim 23, wherein the first and second preexisting word elements are randomly selected from the database.

25. A method as recited in claim 23, wherein the first preexisting word element is an adjective and the second preexisting word element is a noun.

26. A method as recited in claim 23, wherein if the random account name is not unique, the operations producing the unique random account name are repeated for up to a predetermined number of iterations until a unique modified account name is produced.

27. A method as recited in claim 26, wherein if the unique random account name is produced in fewer than the predetermined number of iterations, the method further comprising:
   selecting further word elements from the database;
   combining the further selected word elements to produce a further random account name;
   comparing the further random account name with the list of existing account names to determine whether the further random account name is unique; and
   if the further random account name is unique, providing the second modified account name to the user for acceptance.

28. A method as recited in claim 23, further comprising combining an underscore between the word elements to produce a second random account name if the first random account name is not unique, comparing the second random account name with the list of existing account names to determine whether the second random account name is unique, and if the second random account name is unique, providing the second random account name to the user for acceptance.

29. The method of claim 23, further comprising:
   receiving an acceptance of the random account name from the user.

30. The method of claim 23, further comprising:
   receiving an alternate requested account name from the user.

31. The method of claim 23, further comprising:
   receiving a request to generate an alternate account name from the user.

32. The method of claim 23, wherein the method is repeated until a predetermined number of random account names is produced.

33. A computer-readable medium having computer-executable instructions which when executed by a computing device performs a method of producing a unique random account name in response to a request by a user, the method comprising:
   selecting a first preexisting word element from a database including at least one preexisting list of word elements;

selecting a second preexisting word element from the database;

combining the first and second preexisting word elements to produce a random account name;

comparing the account name with a list of existing account names to determine if the account name is unique; and if the account name is unique, providing the account name to the user for acceptance.

34. A computer-readable medium having computer-executable components which when executed by a computing device produces a unique modified account name based on a requested account name that has been determined to already exist, comprising:

a user interface component for receiving an account name request a database component including at least one preexisting list of word elements and a list of existing account names;

a name generating component for selecting preexisting word elements from the at least one preexisting list of word elements and combining the preexisting word elements with at least a stem of the requested account name to produce modified account names, if the requested account name is not unique when compared to the list of existing account names; and a search component for comparing the modified account names with a list of existing account names to determine whether the modified account names are unique and, if the modified account names are unique, providing the modified account names to the user for acceptance.

35. A computer-readable medium as recited in claim 34, wherein the preexisting word elements are affixes.

36. A computer-readable medium as recited in claim 34, wherein the preexisting word elements are adjectives.

37. A computer-readable medium as recited in claim 34, wherein the name generating component randomly selects the preexisting word elements from the at least one preexisting list of word elements.

38. A computer-readable medium as recited in claim 34, wherein the name generating component further produces a seeded account name based on the requested account name, the seeded account name being produced by combining the at least the stem of the requested account name with a numerical seed, the search component comparing the seeded account name with the list of existing account names to determine whether the seeded account name is unique, and if the seeded account names is unique, providing the seeded account name to the user for acceptance.

39. A computer-readable medium as recited in claim 34, wherein the name generating component further produces a random account name by selecting two further word elements and combining them, the search component comparing the random account name with the list of existing account names to determine whether the random account name is unique, and if the random account name is unique, providing the random account name to the user for acceptance.

40. The computer-readable medium of claim 34, wherein the user interface component is also for receiving an acceptance of one of the modified account names from the user.

41. The computer-readable medium of claim 34, wherein the user interface component is also for receiving an alternate requested account name from the user.

42. The computer-readable medium of claim 34, wherein the user interface is also for receiving a request to generate an alternate account name from the user.

43. The computer-readable medium of claim 34, wherein the preexisting word elements are nouns.

44. The computer-readable medium of claim 34, wherein the preexisting word elements are noun stems.

45. A method of producing a unique account name based on a requested account name comprising computer-implemented steps of:

receiving a request from a user for an account name;

utilizing multiple solution sets to produce a listing of unique account names, wherein there is a limit to the number of iterations for which each one of the multiple solution sets is utilized, and when said limit is reached a different solution set is utilized, and wherein said list of account names must contain a fixed number of unique account names; and presenting the user with said listing of unique names and allowing the user to select one of said listings as an account name;

said multiple solution set comprising: a first solution set to provide at least one unique account name based on the requested account name, by combining the requested account name with a numerical seed;

a second solution set to provide at least one unique account name based on the requested account name, by combining the requested account name with a multi-digit seed if one or more previously utilized solution sets did not provide said fixed number of unique account names within the iteration limit;

a third solution set to provide at least one unique account name based on the requested account name, by prepending the requested account name with an adjective from a list of words, if one or more previously utilized solution sets did not provide said fixed number of unique account names within the iteration limit; and a fourth solution set to provide at least one unique account name, by combining two word elements from two lists of words, if one or more previously utilized solution sets did not provide said fixed number of unique account names within the iteration limit.

46. A method of producing a unique random account name in response to a request by a user, the method comprising computer-implemented steps of:

receiving a request to generate a unique random account name from a user;

providing without any input or suggestion of names from the user, a list of multiple alternate unique account names; and providing the user with the ability to select any one of said alternate unique account names, enter a new string for use as an account name or request an automated generation of a new list of multiple alternate unique account names.

* * * * *